(12) United States Patent
Campus

(10) Patent No.: US 6,454,345 B1
(45) Date of Patent: Sep. 24, 2002

(54) RAIL VEHICLE BODY

(75) Inventor: Emigliano Campus, Yves Bourg (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/924,765

(22) Filed: Aug. 9, 2001

(30) Foreign Application Priority Data

Aug. 30, 2000 (FR) .......................................... 00 11091

(51) Int. Cl.$^7$ ................................................ B60J 7/00
(52) U.S. Cl. ................... 296/203.01; 296/29; 296/178; 296/181
(58) Field of Search ........................... 296/203.01, 197, 296/203.03, 216.09, 29, 105, 178, 397, 187, 181, 901, 191

(56) References Cited

U.S. PATENT DOCUMENTS

| | | | | | |
|---|---|---|---|---|---|
| 2,382,376 | A | * | 8/1945 | Black ........................... | 296/29 |
| 2,427,649 | A | * | 9/1947 | Theriault ..................... | 296/178 |
| 2,600,140 | A | * | 6/1952 | Torseth ......................... | 296/29 |
| 3,186,755 | A | * | 6/1965 | Ward ..................... | 296/203.03 |
| 3,827,137 | A | * | 8/1974 | Schubach ................... | 296/178 |
| 3,881,765 | A | * | 5/1975 | Cerra et al. ................. | 296/178 |
| 3,944,008 | A | * | 3/1976 | Moore ......................... | 296/29 |
| 3,968,989 | A | * | 7/1976 | Schippers .................... | 296/29 |
| 3,981,107 | A | * | 9/1976 | Schubach ................... | 296/178 |
| 4,221,426 | A | * | 9/1980 | Wardill ....................... | 296/178 |
| 4,353,313 | A | * | 10/1982 | Panagin ...................... | 296/178 |
| 4,974,900 | A | * | 12/1990 | Destefani et al. ........... | 296/187 |
| 5,041,318 | A | * | 8/1991 | Hulls .......................... | 296/29 |
| 5,042,395 | A | * | 8/1991 | Wackerle et al. ........... | 296/197 |
| 5,066,067 | A | | 11/1991 | Ferdows | |
| 5,287,813 | A | * | 2/1994 | Hanni et al. ........... | 296/203.01 |
| 5,333,554 | A | * | 8/1994 | Yamada et al. ............. | 296/197 |
| 5,403,063 | A | * | 4/1995 | Sjostedt et al. ............. | 296/181 |
| 5,433,151 | A | * | 7/1995 | Ohara et al. ................ | 296/191 |
| 5,553,906 | A | * | 9/1996 | Kunz .................... | 296/203.03 |
| 5,685,229 | A | * | 11/1997 | Ohara et al. ................ | 296/191 |
| 5,934,741 | A | * | 8/1999 | Beukers et al. ............. | 296/181 |
| 5,997,075 | A | * | 12/1999 | Dunder et al. .............. | 296/178 |
| 6,095,715 | A | * | 8/2000 | Hulls ......................... | 403/231 |
| 6,327,981 | B1 | * | 12/2001 | Norregaard et al. ........ | 296/181 |

FOREIGN PATENT DOCUMENTS

| | | |
|---|---|---|
| DE | 196 06 792 A | 8/1997 |
| EP | 0 260 200 A | 3/1988 |
| EP | 0 309 358 * | 9/1988 |
| EP | 0 310 157 * | 9/1988 |
| EP | 0 335 150 * | 3/1989 |
| EP | WO 91/18780 * | 6/1991 |
| EP | 0 818 373 A | 1/1998 |
| EP | 0 926 036 A | 6/1999 |

* cited by examiner

Primary Examiner—Kiran Patel
(74) Attorney, Agent, or Firm—Sughrue Mion, PLLC

(57) ABSTRACT

In order to increase the robustness and reliability of the vehicle, reduce the time taken to manufacture it, to enable certain stages of such manufacture to be performed by robots, and to be able easily to adapt the appearance of the vehicle on demand, the body is of hybrid structure comprising an aluminum or aluminum alloy "frame assembly", an aluminum or aluminum alloy "roof assembly", and two "fitted-out face assemblies" of composite material each fixed both to the frame assembly and to the roof assembly. The invention is particularly suitable for manufacturing cars for trains.

17 Claims, 1 Drawing Sheet

RAIL VEHICLE BODY

The present invention relates to rail vehicles, and more particularly to a rail vehicle body.

BACKGROUND OF THE INVENTION

It is conventional to build rail vehicles, and in particular the cars of train sets or "rakes", and more particularly to mass-produce them, by making an all-welded "rough", then fixing on insulation elements and cabling elements for transferring fluids (water, heating fluids and/or cooling fluids, and control fluids, in particular for automatic operations) and for conveying electricity, and finally installing interior fittings; building in this way gives rise to a manufacturing time that is lengthy and to tooling costs that are high.

In addition, connections between door uprights and windows give rise to dimensioning problems because they must be of excellent reliability in spite of fatigue due to the intense and repeated forces to which they are exposed. More particularly, connections made by welding are particularly sensitive to such forces.

OBJECTS AND SUMMARY OF THE INVENTION

An object of the invention is to remedy those drawbacks by reducing assembly time and tooling costs.

Another object of the invention is to create a rail vehicle bodywork structure that makes it possible to combine good aerodynamic characteristics, pleasing appearance, and reduced mass, facilitating the distribution of equipment if it is desired to make a rake with distributed motors.

To this end, the invention relates to a vehicle body, the body being of hybrid structure comprising a metal "frame assembly" of aluminum or aluminum alloy, an aluminum or aluminum alloy "roof assembly", and two "fitted-out face assemblies" of composite material each fixed both to the frame assembly and to the roof assembly.

Because face coverings are used as structural assembly elements of the bodywork, the vehicle can be prefabricated and building is simplified and made faster by integrating subassemblies that are already fitted out; it is also possible to include continuous glazing, thereby improving the appearance of the vehicle.

The body can also present one or more of the following characteristics:

- the frame assembly comprise a floor and two side-sill panels extending from the floor towards the roof assembly in such a manner that the cross-section of the frame assembly is generally U-shaped;
- each of the side-sill panels has a bottom margin at an obtuse angle connected to the floor;
- the roof assembly comprises a roof panel presenting a central region and two side regions extending on either side of the central region, the side regions sloping towards the frame assembly and away from the central region;
- each fitted-out face assembly has a face of composite material placed facing a side-sill panel of the frame assembly, a strip of composite material placed facing one of the side regions of the roof assembly, and uprights of composite material interconnecting the face and the strip;
- the face of composite material extends at least in part into the inside of the frame assembly;
- the strip of composite material extends at least in part inside the roof assembly;
- the fitted-out face assemblies comprise respective faces of composite material each having an outwardly directed top flange facing a top edge of the frame assembly, said top flange being fixed to said edge by bolts;
- the fitted-out face assemblies have strips each fixed to a corresponding side region of the roof assembly by bolts;
- the fitted-out face assemblies have faces of composite material each including an inwardly directed bottom flange facing an angled bottom margin of a side-sill panel, said flange being fixed to said margin by bolts;
- the fitted-out face assemblies include door frames;
- the fitted-out face assemblies include seat supports;
- the body includes glazing fixed to the fitted-out face assemblies;
- it includes insulating panels between the side-sill panels belonging to the frame assembly and the faces belonging to the fitted-out face assemblies;
- the frame assembly includes a floor comprising at least one multi-tube extrusion of aluminum for aluminum alloy;
- the frame assembly includes a floor comprising cross-members made of aluminum or aluminum alloy;
- the frame assembly includes side-sill panels comprising at least one multi-tube aluminum or aluminum alloy extrusion;
- the roof assembly includes at least one multi-tube aluminum or aluminum alloy extrusion; and
- the frame assembly and the roof assembly include multi-tube extrusions having cells extending therein and receiving nut-forming means for enabling the fitted-out face assemblies to be fixed by screw fastening.

BRIEF DESCRIPTION OF THE DRAWING

Other characteristics and advantages of the invention will appear from the following description of an embodiment of the invention given by way of non-limiting example and shown in the accompanying drawing, in which.

MORE DETAILED DESCRIPTION

Figure 1:
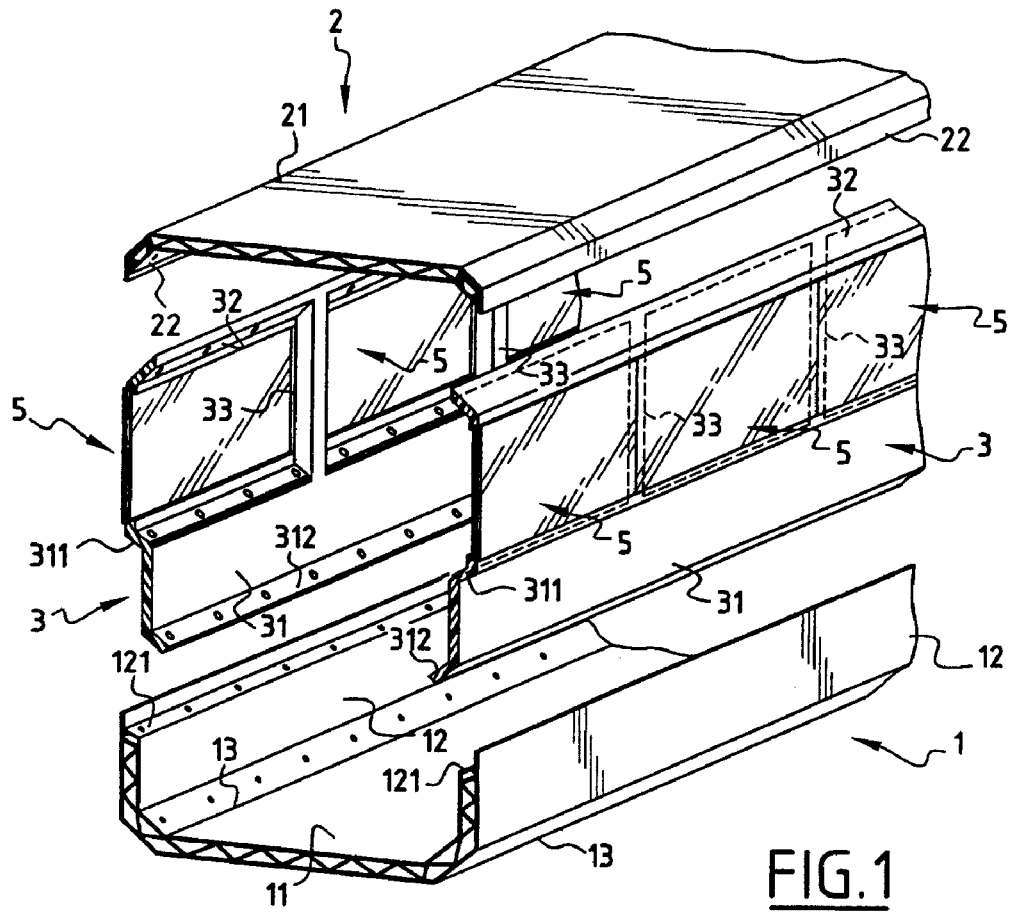
FIG. 1 is a diagrammatic exploded perspective view of a vehicle body segment in accordance with the invention.

The segment of vehicle body shown in FIG. 1 is a "rough" of hybrid structure, comprising a metal "frame assembly" 1, e.g. of aluminum or aluminum alloy, a "roof" assembly 2 also made of metal which can be aluminum or aluminum alloy, and two "fitted-out face" assemblies 3 of material known as "composite material" each of which is fixed to the frame assembly and to the roof assembly.

The frame assembly 1 has a floor 11 which can be constituted either by cross-members or else by multi-tube extrusions, and side-sills comprising two panels 12 constituted by multi-tube extrusions and extending upwards from the floor towards the roof assembly so that the cross-section of the frame assembly is generally U-shaped. The panels 12 have bottom margins at an obtuse angle, e.g. at 135° with bottom edges 13 connected to the floor 11.

The roof assembly 2 is likewise constituted by at least one multi-tube extrusion of aluminum or aluminum alloy; it has a roof panel with a central region 21 and two side regions 22 extending on either side of the central region, the side regions sloping downwards towards the frame assembly 1 and away from the central region 21; by way of example, these regions are at an obtuse angle relative to the central region.

Each of the fitted-out face assemblies 3 of composite material comprises a face 31 placed facing one of the side-sill panels 12 of the frame assembly 1, and a strip 32 placed facing a corresponding side region 22 of the roof assembly 2; it includes uprights 33 connecting the face 31 to the strip 32.

Figure 2:
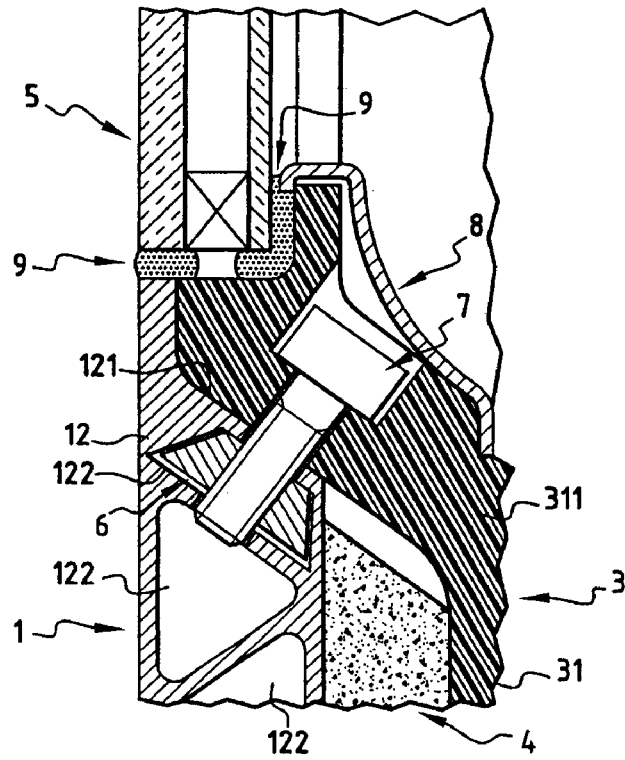
FIG. 2 is a diagram showing an example of how a connection between a fitted-out face assembly and the frame assembly or the roof assembly can be arranged in a FIG. 1 vehicle body, this figure being in section on a plane extending across the vehicle.

The face 31 placed facing a side-sill panel 12 extends into the inside of the frame assembly 1 and it is separated from the panel 12 by thermal and acoustic insulation, e.g. constituted by insulating panels 4 (FIG. 2). Similarly, the strip 32 placed facing a side region 22 of the roof assembly 2 extends inside said roof assembly and is separated from the side region by similar insulation.

The face 31 placed facing a side-sill panel 12 has an outwardly directed top flange 311 facing a chamfered top edge 121 of the frame assembly, with the uprights 33 extending upwards therefrom. This flange 311 is fixed to the edge 121 by screw fasteners, in particular by bolts as described below. The face 31 also has an inwardly directed bottom flange 312 facing one of the angled bottom margins of the side-sill panels 12, and fixed to the bottom margin by screw fasteners, in particular by bolts.

Similarly, each of the strips 32 is connected to a corresponding side region 22 of the roof assembly 2 in similar manner.

The fitted-out face assemblies 3 also include door frames, seat supports, and face lining material, so as to allow continuous glazing and/or windows 5 to be fixed to the fitted-out face assemblies 3.

The connection arrangement shown in FIG. 2 is constituted by a screw fastener whereby the top flange 311 of a face 31 of a fitted-out face assembly 3 is fixed to a top edge 121 of a side-sill panel 12; the other connection arrangements between the fitted-out face assembly 3 and the frame assembly 1 or the roof assembly 2 can be analogous.

As shown, the side-sill panels 12 are preferably multi-tube extrusions; inside these panels 12 there extend cells 122 including one (the closest to the edge) which is fitted with spaced-apart nuts 6 or with a bar having spaced-apart tapped holes pierced therethrough to form nuts 6, with the nuts preferably being approximately regularly spaced apart; the flange 311 of the face 31 is pierced in register with the nuts 6 by smooth holes for passing bolts 7 that engage the nuts; the heads of the bolts are received in countersunk holes in the top flange 311; in this case the edge 121 of the side-sill is chamfered at about 45°; when the nuts 6 are separate, they can be prismatic in shape approximately matching the shape of the cell 122 in which they are received so as to prevent them turning when the corresponding bolt is turned; the heads of the bolts 7 are hidden by metal trim 8. FIG. 2 also shows the top of an insulating panel 4 and the bottom of double glazing 5 secured by strips of insulating mastic 9 that can be seen in this figure at the top of the side-sill and against the fitted-out face assembly 3.

The above design considerably simplifies the rough, eliminates sensitive zones in the corners of the glazing, reduces the time required to assemble the rough (installing the windows during the subassembly stage, simplifying and reducing assembly time, suitable for being assembled while flat thus making it possible for assembly to be performed by robots, and reducing the time during which the rough is unavailable), it is possible to integrate cabling and insulation while making the subassemblies, it is possible to prefit the frame and the roof, it is possible to alter the appearance of the vehicle (e.g. by changing the number of glazing panels and/or windows), and it is also possible to provide continuous glazing.

Naturally, the invention is not limited to the embodiments described above and shown, and it is possible to provide others without going beyond the ambit of the invention.

What is claimed is:

1. A vehicle body, the body being of hybrid structure comprising a metal frame assembly of one of aluminum and aluminum alloy, one of an aluminum and aluminum alloy roof assembly, and two fitted-out face assemblies of composite material each fixed both to the frame assembly and to the roof assembly.

2. A vehicle body according to claim 1, wherein the frame assembly comprises a floor and two side-sill panels extending from the floor towards the roof assembly in such a manner that the cross-section of the frame assembly is generally U-shaped.

3. A vehicle body according to claim 2, wherein each of the side-sill panels has a bottom margin at an obtuse angle connected to the floor.

4. A vehicle body according to claim 1, wherein the roof assembly comprises a roof panel presenting a central region and two side regions extending on either side of the central region, the side regions sloping towards the frame assembly and away from the central region.

5. A vehicle body according to claim 1, wherein each fitted-out face assembly has a face of composite material placed facing a side-sill panel of the frame assembly, a strip of composite material placed facing one of the side regions of the roof assembly, and uprights of composite material interconnecting the face and the strip.

6. A vehicle body according to claim 5, wherein the face of composite material extends at least in part into the inside of the frame assembly.

7. A vehicle body according to claim 5, wherein the strip of composite material extends at least in part inside the roof assembly.

8. A vehicle body according to claim 1, wherein the fitted-out face assemblies comprise respective faces of composite material each having an outwardly-directed top flange facing a top edge of the frame assembly, said top flange being fixed to said edge by bolts.

9. A vehicle body according to claim 1, wherein the fitted-out face assemblies have strips each fixed to a corresponding side region of the roof assembly by bolts.

10. A vehicle body according to claim 1, wherein the fitted-out face assemblies have faces of composite material each including an inwardly directed bottom flange facing an angled bottom margin of a side-sill panel, said flange being fixed to said margin by bolts.

11. A vehicle body according to claim 1, including glazing fixed to the fitted-out face assemblies.

12. A vehicle body according to claim 1, including insulating panels between the side-sill panels belonging to the frame assembly and faces belonging to the fitted-out face assemblies.

13. A vehicle body according to claim 1, wherein the frame assembly includes a floor comprising at least one multi-tube extrusion of one of aluminum and aluminum alloy.

14. A vehicle body according to claim 1, wherein the frame assembly includes a floor comprising cross-members made of one of aluminum and aluminum alloy.

15. A vehicle body according to claim 1, wherein the frame assembly includes side-sill panels comprising at least one multi-tube aluminum or aluminum alloy extrusion.

16. A vehicle body according to claim 1, wherein the roof assembly includes at least one multi-tube aluminum or aluminum alloy extrusion.

17. A vehicle body according to claim 1, wherein the frame assembly and the roof assembly include multi-tube extrusions having cells extending therein and receiving nut-forming means for enabling the fitted-out face assemblies to be fixed by screw fastening.

* * * * *